Dec. 6, 1955
J. G. LINDEMAN ET AL
2,725,809
CARRIER MEANS FOR IMPLEMENTS OR THE
LIKE AND POWER MEANS THEREFOR
Filed Nov. 8, 1948
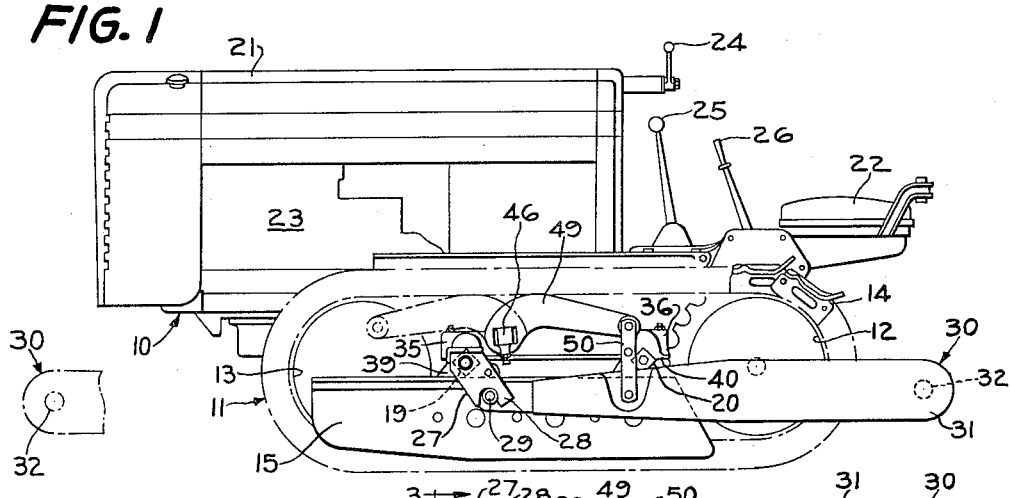
FIG. 1
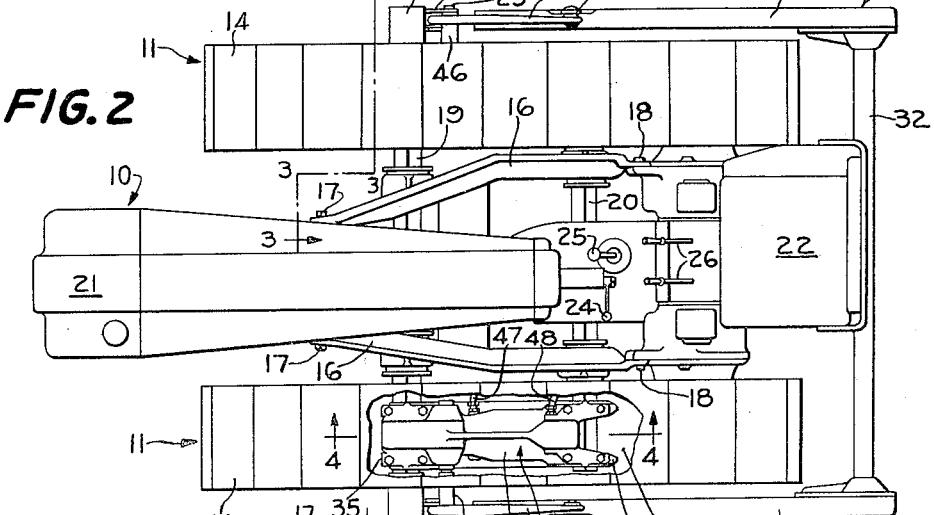
FIG. 2
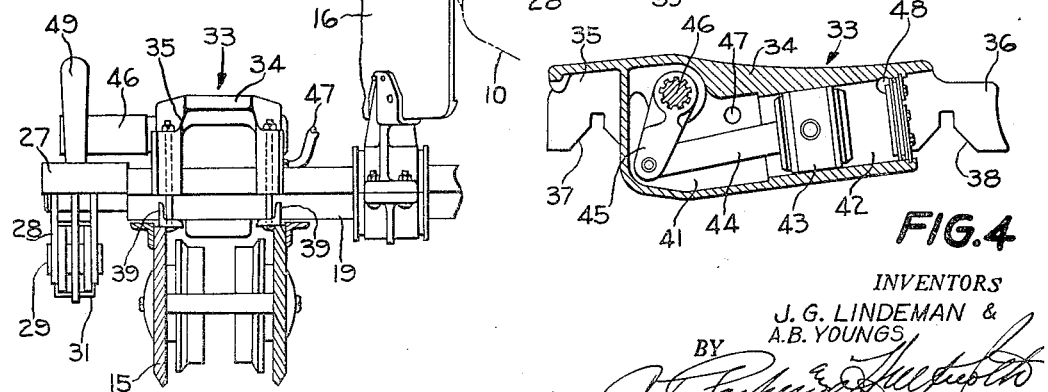
FIG. 3
FIG. 4
INVENTORS
J. G. LINDEMAN &
A. B. YOUNGS
BY
ATTORNEYS

United States Patent Office 2,725,809
Patented Dec. 6, 1955

2,725,809

CARRIER MEANS FOR IMPLEMENTS OR THE LIKE AND POWER MEANS THEREFOR

Jesse G. Lindeman and Alfred Byron Youngs, Yakima, Wash., assignors, by mesne assignments, to Deere & Company, Moline, Ill., a corporation of Illinois Application November 8, 1948, Serial No. 58,848

7 Claims. (Cl. 97—47.2)

This invention relates to carrier means for mounting agricultural implements or similar tools on a tractor. More particularly, the invention relates to such carriers that may be utilized at either end of the tractor or equivalent vehicle.

In the use of many types of agricultural or earth-moving implements, it is desirable to have a structure adapted for mounting on a tractor or equivalent vehicle so that the tools may be used either at the front or rear of the tractor. Arrangements of this type are generally known but have not been completely successful, because it was heretofore necessary, in the reversal of the mounting structure, to reverse the power means used for adjusting the tools. Since these power adjusting means, ordinarily of the hydraulic cylinder and piston type, are relatively heavy, the interchangeability or reversal of the structure could not be easily and readily accomplished, particularly in the field.

According to the present invention, it is the principal object to provide an arrangement of the general type referred to in which the power means need not be reversed in their entireties. This result is accomplished by so relating the mounting of the power means to the mounting of the carrier means that it is necessary merely to reverse a single power-transmitting arm for each power unit or device. A further object resides in the provision of a power unit of the fluid-motor type which is capable of delivering equal power in either direction. This feature is important in connection with the reversibility of the carrier so that the carrier and power units have the same operational characteristics regardless of whether the carrier is operating at the front or the rear end of the vehicle. In this respect, the invention provides a power unit of the type in which the operating parts are totally enclosed in a casing or chamber communicating with the cylinder in which the motor piston reciprocates, there being a rockshaft or equivalent power take-off means extending externally of the chamber for the mounting thereon of a power-transmitting arm.

In more specific aspects, the invention deals with the application of a carrier of the general type referred to to a tractor of the crawler or track-laying type; although, the invention is not limited to such arrangements.

The foregoing and other important objects and desirable features of the invention will become apparent to those versed in the art as a complete disclosure is made of a preferred embodiment of the invention in the following detailed description and accompanying sheet of drawings in which:

Figure 1 is a side elevational view of a crawler tractor equipped with the carrier and improved power means, the carrier being shown in full lines at the rear of the tractor and illustrated in part in broken lines at the front of the tractor;

Figure 2 is a plan view of the structure shown in Figure 1, a portion of the left hand traction unit being broken away to expose the left hand power means;

Figure 3 is a transverse sectional view, on an enlarged scale as viewed along the line 3—3—3—3 of Figure 2; and Figure 4 is a longitudinal sectional view taken substantially along the line 4—4 of Figure 2, but on an enlarged scale, showing the interior of one of the power means.

The vehicle or supporting structure chosen for the purposes of illustration is a tractor of the track-laying type comprising a longitudinal body 10 supported by and between a pair of laterally spaced, longitudinally extending traction units, each designated generally by the numeral 11. Since each traction unit is substantially identical, a description of the left hand unit will suffice for both.

Each traction unit comprises a pair of longitudinally spaced rotary elements in the form of a driving sprocket 12 and a front idler 13 about which is trained an endless track 14. Each traction unit is further provided with a longitudinally extending supporting means in the form of a track frame 15. The traction unit to the extent described may be of any conventional construction and that illustrated is merely representative.

The tractor body 10 is supported by and between the traction units by means of a subsidiary frame structure comprising a pair of laterally spaced, longitudinally running frame members 16, each of which is secured at its forward and rearward ends to the tractor body at 17 and 18 respectively. The supporting or suspension of the body on the traction unit may be accomplished in any desired manner. The particular supporting structure illustrated forms the subject matter of assignee's co-pending application, Serial No. 56,295, filed October 25, 1948, now Patent No. 2,604,176, issued July 22, 1952, and will be described only generally here.

In addition to the longitudinal members 16, the supporting structure includes a pair of longitudinally spaced, transversely extending supporting members 19 and 20. Each of these members extends a sufficient distance laterally at either side of the tractor body so that its opposite ends rest respectively on and are supported by the track frames 15. The tractor structure itself is completed by a forwardly located radiator grille and hood structure 21 and a rearwardly located operator's seat 22. The structure 21 overlies an internal combustion engine 23 and operation of the tractor and its allied equipment is controlled by a plurality of control members 24, 25 and 26.

Each of the outer ends of the forward transverse member 19 is provided with supporting means in the form of a bracket 27 which has a downwardly and rearwardly extending portion 28 serving to provide a mounting means in the form of a pivot 29 on a transverse axis. The pivotal mounting means 29 are coaxially aligned on a transverse axis substantially centrally located between the front and rear ends of the tractor and provide means for mounting on the tractor a carrier structure designated generally by the numeral 30. This carrier is in the form of a U-shaped structure having a pair of laterally spaced, longitudinally extending beams or levers 31 rigidly interconnected across proximate ends by a transverse beam or member 32. In the position of the carrier shown in Fig. 2 and in full lines in Fig. 1, the transverse member 32 is at the rear of the tractor and the beams 31 extend longitudinally rearwardly from the pivots 29. As indicated in broken lines in Figure 1, the carrier 30 may be reversed so that the transverse member 32 is at the front of the tractor and the beams 31 extend longitudinally forwardly from the pivots 29. The reversibility of the carrier is accommodated by the location of the pivots 29 substantially centrally between the front and rear ends of the tractor, as stated above.

For the purpose of controlling or adjusting the carrier structure 30, there is provided a pair of carrier adjusting mechanisms or power-transmitting devices or units 33, one at each side of the tractor, as will appear from an examination of Figures 2 and 3. In the present case, each device 33 is appropriately and conveniently mounted in association with a proximate track frame, being preferably supported on the proximate end of the transverse members 19 and 20. The construction is such that each device 33 comprises a main housing or casing 34 provided respectively at its front end and rear ends with mounting portions 35 and 36. As best shown in Figure 4, these mounting portions are recessed at 37 and 38 respectively in such manner as to accommodate the upper half of the approximate end portions of the transverse members 19 and 20, the latter being, as shown, preferably square in cross section. Each of the track frames 15 has appropriate complementary carrying structures 39 and 40 which respectively receive the lower portions of the proximate ends of the members 19 and 20 and which cooperate with the portions 35 and 36 to accomplish the dual function of securing the members 19 and 20 to the track frames and of mounting the power devices 33 on the track frames. As stated above, the particular details of the mounting of the frame structure including the members 16 on the track frames 15 are fully disclosed in assignee's patent referred to above. Likewise, the particular details of the mounting of the power units form the subject matter of that patent and further illustrations and description are not included here. Suffice it to say that the devices or units 33 are rigidly carried on the tractor by means of the track frames 15. It will be obvious, of course, that the units could be directly mounted on the tractor body. However, the mounting of the units as illustrated arranges these units in close proximity to the beams 31 of the carrier 30.

As best shown in Figure 4, each of the power-transmitting units includes a chamber 41 which opens into a cylinder 42. A piston 43 is carried by the cylinder 42 and is connected by a connecting rod 44 to a crank arm 45. This arm is totally enclosed in the chamber 41, as is the interior portion of a rockable member in the form of a rockshaft 46. The component just described provides a fluid-pressure motor of the cylinder and piston type. Further, the motor is of the two-way or bidirectional type in which fluid under pressure may be introduced to the cylinder at either end of the piston 43 for forcing the piston in one direction or the other. Fluid under pressure from any suitable source (not shown) is supplied to the unit by fluid-pressure-transmitting means including conduits 47 and 48. Means for supplying fluid under pressure to the devices 33 has not been illustrated, since such means may take any of various forms and may be suitably connected to derive power from the tractor engine 23, in a manner well known to those versed in the art. The rockshaft 46 for the right hand unit extends laterally to the right (Figure 3) and the rockshaft for the left hand unit extends, of course, to the left (Figure 2). Each rockshaft has fixed thereto for rocking movement therewith a power-transmitting member in the form of an arm 49. When the carrier is in its rear position, as illustrated in full lines in Figure 1, the arms 49 extend rearwardly and are connected respectively to the beams 31 of the carrier by links 50. When the carrier is in its forward position, the arms 49 are removed from the rockshafts 46 and are reversed, as indicated in broken lines in Figure 1, and the links 50 are utilized to establish the new connections. Regardless of the position of the carrier, the cylinder units 33 remain in their original positions.

Inasmuch as the connecting rod 44 and crank arm 45 of each device 33 are totally enclosed within the chamber 41, there will be no variation in power delivered by the device regardless of which direction the piston 43 moves, as would be the case in the ordinary type of cylinder and piston assembly in which the rod extends through one end of the cylinder. Thus, each device is capable of delivering equal power in either direction of movement of the piston 43. Therefore, the carrier 30 will have the same operational characteristics, so far as concerns the power units 33, regardless of the position thereof.

The feature of the invention residing in the provision of reversibility or interchangeability of the carrier without requiring reversal or interchanging of the cylinder is important from the standpoint of minimizing the labor necessary to make the conversion, so that use of the carrier at either end of the tractor is a relatively simple matter. Incorporation in the arrangement of the power devices 33 which have equal power in either direction, increases the flexibility of the carrier structure as a whole. Other features of the invention not specifically pointed out above will occur to those versed in the art, as will many modifications and alterations in the preferred construction illustrated, all of which may be achieved without departing from the spirit and scope of the invention as defined in the appended claims.

What is claimed is:

1. For a tractor or the like including longitudinal supporting structure having front and rear ends, the combination of: means carried on said structure and providing respectively at opposite sides of said structure a pair of mounting portions including pivots coaxial on a transverse axis generally midway between the front and rear ends of said structure; a single, reversible carrier having a pair of laterally spaced, generally longitudinally extending side beams interconnected at one end by a transverse member and having at its opposite ends means for mounting the beams respectively on the aforesaid pivots for vertical swinging of the carrier about said pivot axis, said beams and member being so dimensioned that the carrier is reversible and the beams may extend either forwardly or rearwardly from said pivots at opposite sides of the supporting structure to dispose the transverse member at either the front or rear end of said structure; a pair of power-transmitting devices, one at and carried at each side of said structure, and each including a base part fixedly positioned on said structure regardless of the position of the carrier, and a rocking element rockable about a transverse axis, said axes being transversely alined generally midway between the front and rear ends of said structure; and a power-transmitting connection between each rocking element and the respective side beam of the carrier, including a reversible part constructed to extend in one longitudinal direction when the carrier beams extend rearwardly and disconnectible and reconnectible relative to its rocking element to extend in the opposite longitudinal direction when said beams extend forwardly.

2. The invention defined in claim 1, further characterized in that: each power-transmitting device is a bidirectional fluid-pressure motor capable of developing equal power in either direction so as to have the same operational characteristics in the transmission of power to the carrier in either of the positions of said carrier.

3. For a tractor or the like including longitudinal supporting structure having front and rear ends, the combination of: means carried on said structure and providing respectively at opposite sides of said structure a pair of mounting portions including pivots coaxial on a transverse axis generally midway between the front and rear ends of said structure; a single, reversible carrier having a pair of laterally spaced, generally longitudinally extending side beams interconnected at one end by a transverse member and having at its opposite ends means for mounting the beams respectively on the aforesaid pivots for vertical swinging of the carrier about said pivot axis, said beams and member being so dimensioned that the carrier is reversible and the beams may extend either forwardly or rearwardly from said pivots at opposite sides of the supporting structure to dispose the transverse member at either the front or rear end of said structure; power-transmitting means carried by said structure and including a base part fixedly positioned on said structure regardless of the position of the carrier, and an element rockable about a transverse axis generally midway between the front and rear ends of said structure; and a power-transmitting connection between said element and the side beams of the carrier, including at each side a reversible part constructed to extend in one longitudinal direction when the carrier beams extend rearwardly and disconnectible and reconnectible relative to its rocking element to extend in the opposite longitudinal direction when said beams extend forwardly.

4. For a tractor of the track-laying type having a longitudinal body carried between a pair of longitudinally extending traction units including track frames, the combination of: means on each track frame providing a supporting pivot on a transverse axis, said pivots being coaxial on a transverse axis substantially midway between the front and rear ends of the tractor; a single, reversible carrier having a pair of laterally spaced, longitudinally running side beams interconnected at proximate end portions by a transverse member and having at opposite proximate end portions means for mounting the beams respectively on the aforesaid pivots for vertical swinging of the carrier with respect to the tractor, said beams and members being so dimensioned that the carrier is reversible and the beams may extend either forwardly or rearwardly from said pivots alongside the track frames to dispose the transverse member at either the front or rear of the tractor; a pair of power-transmitting means, one at each side of the tractor body and carried by the respective track frame, and each including a base part fixedly positioned on the track frame regardless of the position of the carrier, and a rocking element rockable about a transverse axis generally midway between the front and rear ends of the tractor; and a power-transmitting connection between each rocking element and the proximate carrier beam, including a reversible part constructed to extend in one longitudinal direction when the carrier beams extend forwardly and disconnectible and reconnectible relative to its rocking element to extend in the opposite longitudinal direction when the carrier beams extend rearwardly.

5. For a tractor having a longitudinal body carried between a pair of traction units including longitudinally spaced apart rolling elements and supports therefor connected to the body, the combination of: means on the support at each side of the tractor providing a supporting pivot on a transverse axis, said pivots being coaxial on a transverse axis substantially midway between the front and rear ends of the tractor; a single, reversible carrier having a pair of laterally spaced, longitudinally running side beams interconnected at proximate end portions by a transverse member and having at opposite proximate end portions means for mounting the beams respectively on the aforesaid pivots for vertical swinging of the carrier with respect to the tractor, said beams and members being so dimensioned that the carrier is reversible and the beams may extend either forwardly or rearwardly from said pivots alongside the traction units to dispose the transverse member at either the front or rear of the tractor; a pair of power-transmitting means, one at each side of the tractor body and carried by the support of the respective traction unit, and each including a base part fixedly positioned on said support regardless of the position of the carrier, and a rocking element rockable about a transverse axis generally midway between the front and rear ends of the tractor; and a power-transmitting connection between each rocking element and the proximate carrier beam, including a reversible part constructed to extend in one longitudinal direction when the carrier beams extend forward and disconnectible and reconnectible relative to its rocking element to extend in the opposite longitudinal direction when the carrier beams extend rearwardly.

6. In combination: a support, including pivot means; a carrier, means connecting the carrier to the pivot means in a first position and for movement in a first range about said pivot means; means providing for connection of the carrier to the pivot means in a second position substantially diametrically opposite the first position and for movement in a second range generally symmetrical with the first range; a two-way fluid-pressure motor including a casing fixedly positioned on the support irrespective of positioning of the carrier and having a cylinder closed at opposite ends and having its axis normal to the aforesaid pivot means, a piston carried by the cylinder for axial reciprocation and having axially opposite effective face portions of equal area, a rockshaft extending through the casing on an axis parallel to and adjacent the pivot means, and means within the casing operatively interconnecting the rockshaft and piston; an arm reversibly mountable on a portion of the rockshaft outside the casing in either of two radially extending, substantially diametrically opposed positions and movable by the rockshaft in either of two substantially symmetrical ranges to accommodate either of the ranges and positions of the carrier; and means for interconnecting the arm and carrier in either of the positions thereof.

7. In combination: a support, including pivot means; a carrier, means connecting the carrier to the pivot means in a first position and for movement in a first range about said pivot means; means providing for connection of the carrier to the pivot means in a second position substantially diametrically opposite the first position and for movement in a second range generally symmetrical with the first range; a two-way fluid-pressure motor including a casing fixedly positioned on the support irrespective of positioning of the carrier and having a cylinder disposed with its axis normal to the aforesaid pivot means; a piston carried by the cylinder for axial reciprocation therein; a rockshaft journaled on the casing on an axis parallel to and adjacent the pivot means, and means operatively interconnecting the rockshaft and piston; an arm reversibly mountable on a portion of the rockshaft outside the casing in either of two radially extending, substantially diametrically opposed positions and movable by the rockshaft in either of two substantially symmetrical ranges to accommodate either of the ranges and positions of the carrier; and means for interconnecting the arm and carrier in either of the positions thereof.

References Cited in the file of this patent

UNITED STATES PATENTS

| | | |
|---|---|---|
| 1,991,781 | Bird | Feb. 19, 1935 |
| 2,296,827 | Anderson et al. | Sept. 29, 1942 |
| 2,316,760 | Anderson et al. | Apr. 20, 1943 |
| 2,401,378 | Smith | June 4, 1946 |
| 2,402,352 | Taylor | June 18, 1946 |
| 2,444,321 | Wooldridge | June 29, 1948 |
| 2,589,104 | Lindeman | Mar. 11, 1952 |

FOREIGN PATENTS

| | | |
|---|---|---|
| 370,891 | Germany | Mar. 8, 1923 |
| 248,089 | Italy | May 5, 1926 |